Jan. 21, 1947.  E. A. WRIGHT  2,414,784
TOOL DRESSING APPARATUS
Filed April 9, 1943  5 Sheets-Sheet 1

INVENTOR.
Erne Aloysius Wright
BY
Furman Rinehart
ATTORNEY

Jan. 21, 1947. E. A. WRIGHT 2,414,784
TOOL DRESSING APPARATUS
Filed April 9, 1943 5 Sheets-Sheet 2

INVENTOR.
*Erne Aloysius Wright*
BY
*Furman Rinehart*
ATTORNEY

Jan. 21, 1947.　　E. A. WRIGHT　　2,414,784
TOOL DRESSING APPARATUS
Filed April 9, 1943　　5 Sheets-Sheet 3
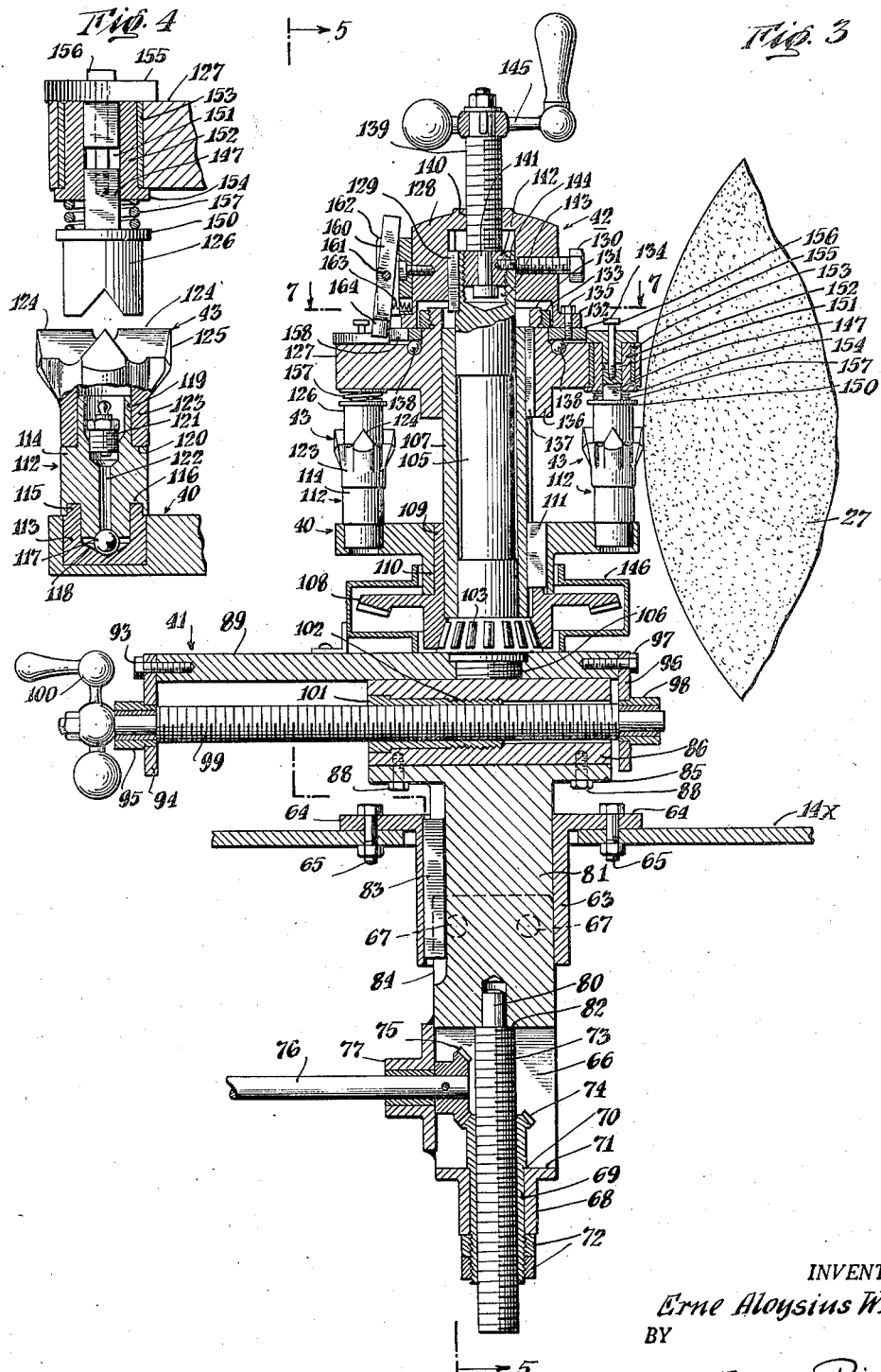
INVENTOR.
Erne Aloysius Wright
BY
Furman Rinehart
ATTORNEY

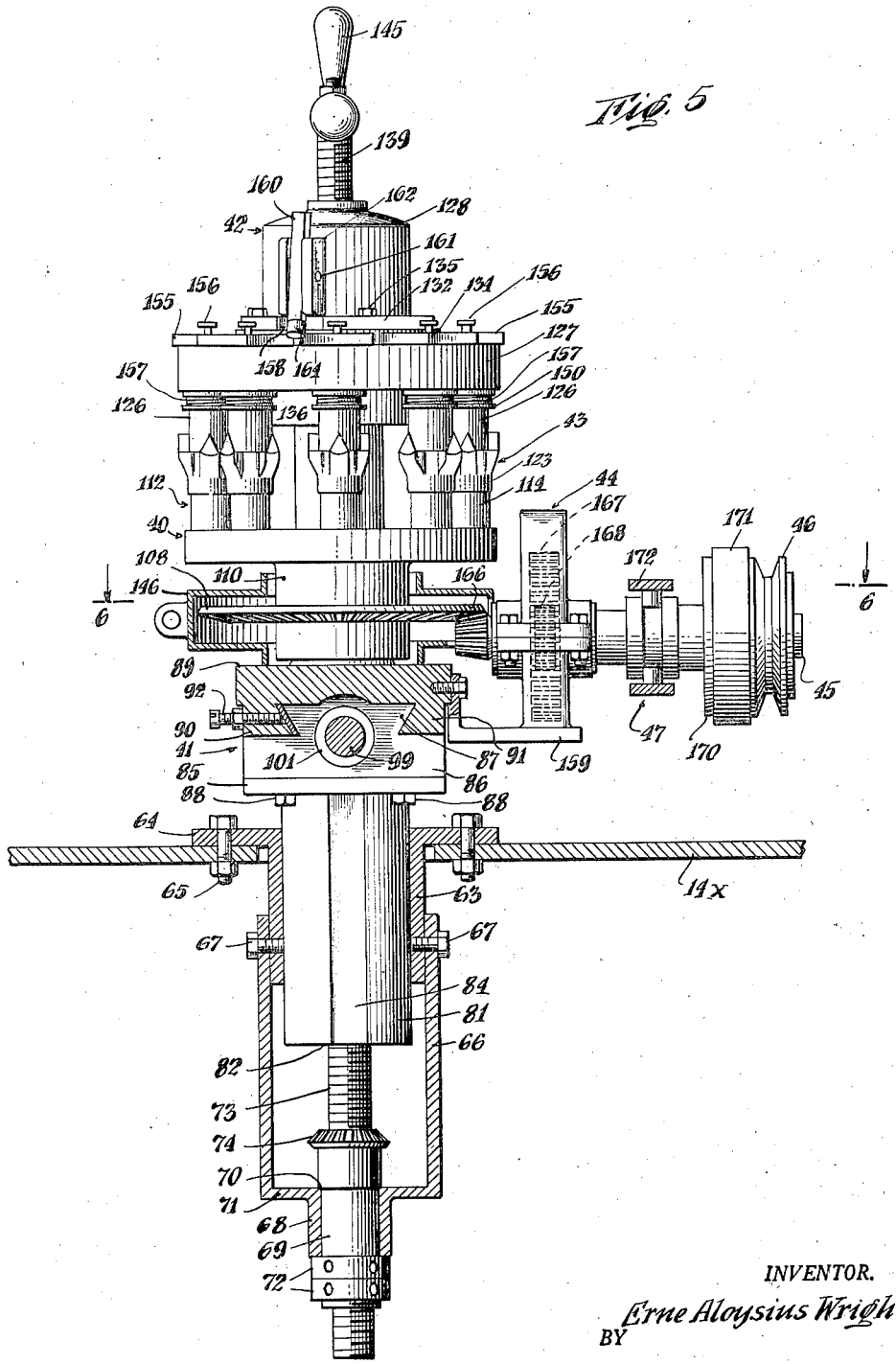

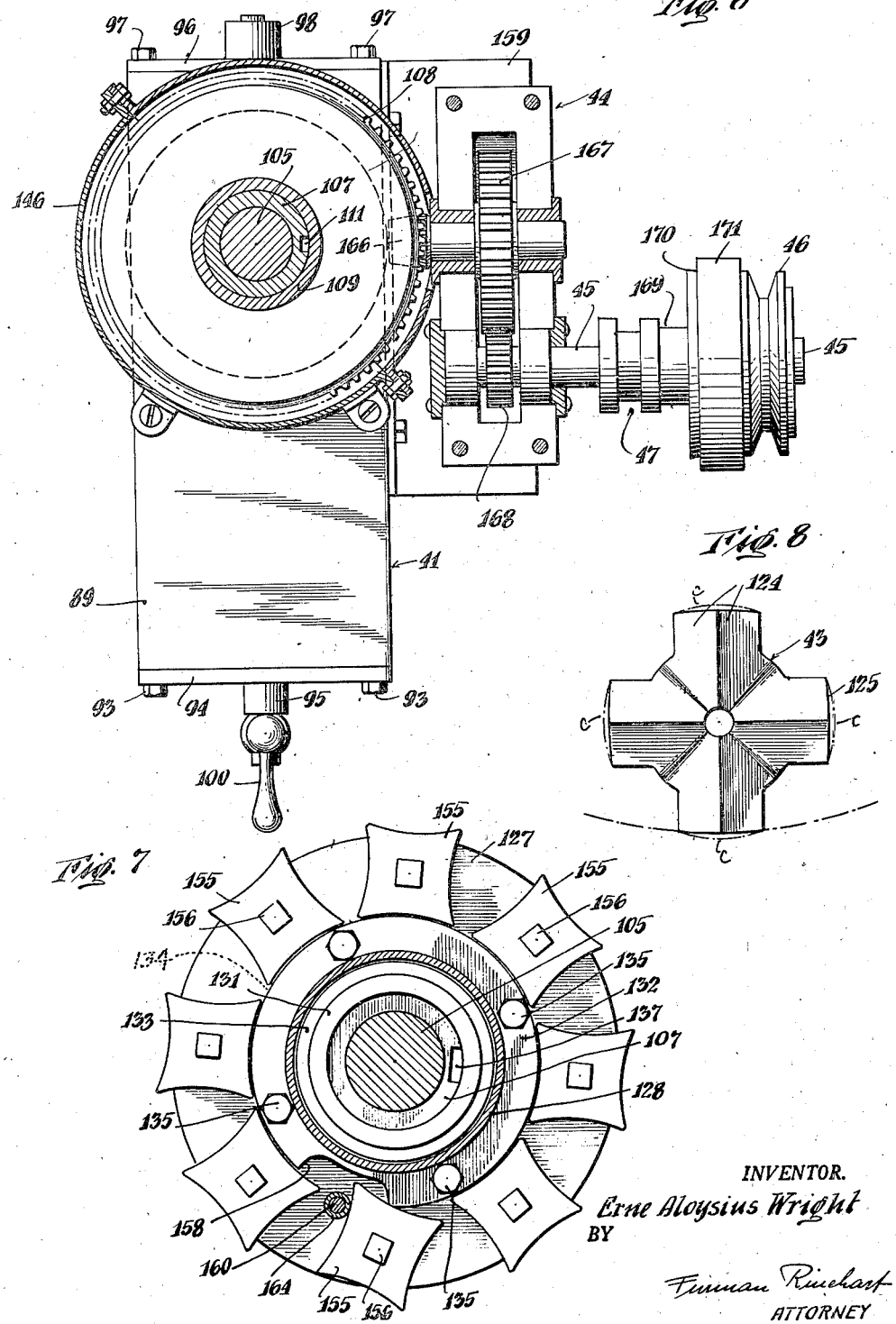

Patented Jan. 21, 1947

2,414,784

UNITED STATES PATENT OFFICE 2,414,784

TOOL DRESSING APPARATUS

Erne Aloysius Wright, Santa Barbara, Mexico, assignor to American Smelting and Refining Company, New York, N. Y., a corporation of New Jersey Application April 9, 1943, Serial No. 482,443

10 Claims. (Cl. 51—108)

This invention relates to tool dressing apparatus and more particularly to machines for gauging demountable drill bits.

In general, a machine constructed in accordance with the invention comprises a frame, a turntable mounted on the frame, mechanism to rotate the turntable, tool holders arranged circumferentially on the turntable to mount a plurality of tools to be dressed and to travel in an orbital path about the axis of the turntable, mechanism to rotate tools so mounted on their own axes as the tools to be dressed revolve in their orbital path about the turntable axis when it is rotated, a dressing tool operative to dress the tools so mounted on the turntable, and adjustable means to bring the tool dressing tool and the tools to be dressed into tool dressing engagement.

The invention provides apparatus which is automatic in operation to dress or gauge tools, such, for example, as drilling bits, in such manner that their wing side faces after gauging are nearly flat.

According to a preferred embodiment of the invention there is provided a machine which comprises a driven turntable upon which a plurality of bits may be mounted circumferentially to travel in an orbit about the axis of the turntable as the latter is rotated. Each bit is mounted on the turntable so that it may be rotated about its own axis. Means are provided to clamp the bits as the bits revolve about the axis of the turntable when it is rotatably driven and to hold each bit firmly when it is brought successively into grinding engagement with a rotating abrasive wheel. With each revolution of the turntable about its axis each drill bit mounted thereon as it travels in its orbital path is given an angular rotative movement about its own axis sufficient to present its next successive wing side face to be ground as it passes over the face of the grinding wheel. Means are provided for easy mounting of a plurality of bits on the turntable for grinding and to remove same after all wing faces have been ground and the bit dressed to proper gauge. Means are also provided for vertical and horizontal adjustment of the turntable whereby the bits, travelling in their orbital path about the axis of the turntable, are properly positioned with relation to the working face of the grinding wheel.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a top plan view of a dual unit machine embodying the invention;

Fig. 3 is a view on line 3—3 of Fig. 1;

Fig. 4 is a view partly in cross section to show the means for mounting the drill bits on the turntable and for holding them in bit grinding position;

Fig. 5 is a view on line 5—5 of Fig. 3;

Fig. 6 is a view on line 6—6 of Fig. 5;

Fig. 7 is a view on line 7—7 of Fig. 3; and

Fig. 8 is a view to show the flat wing side faces of bits dressed according to the invention.

Figure 1:
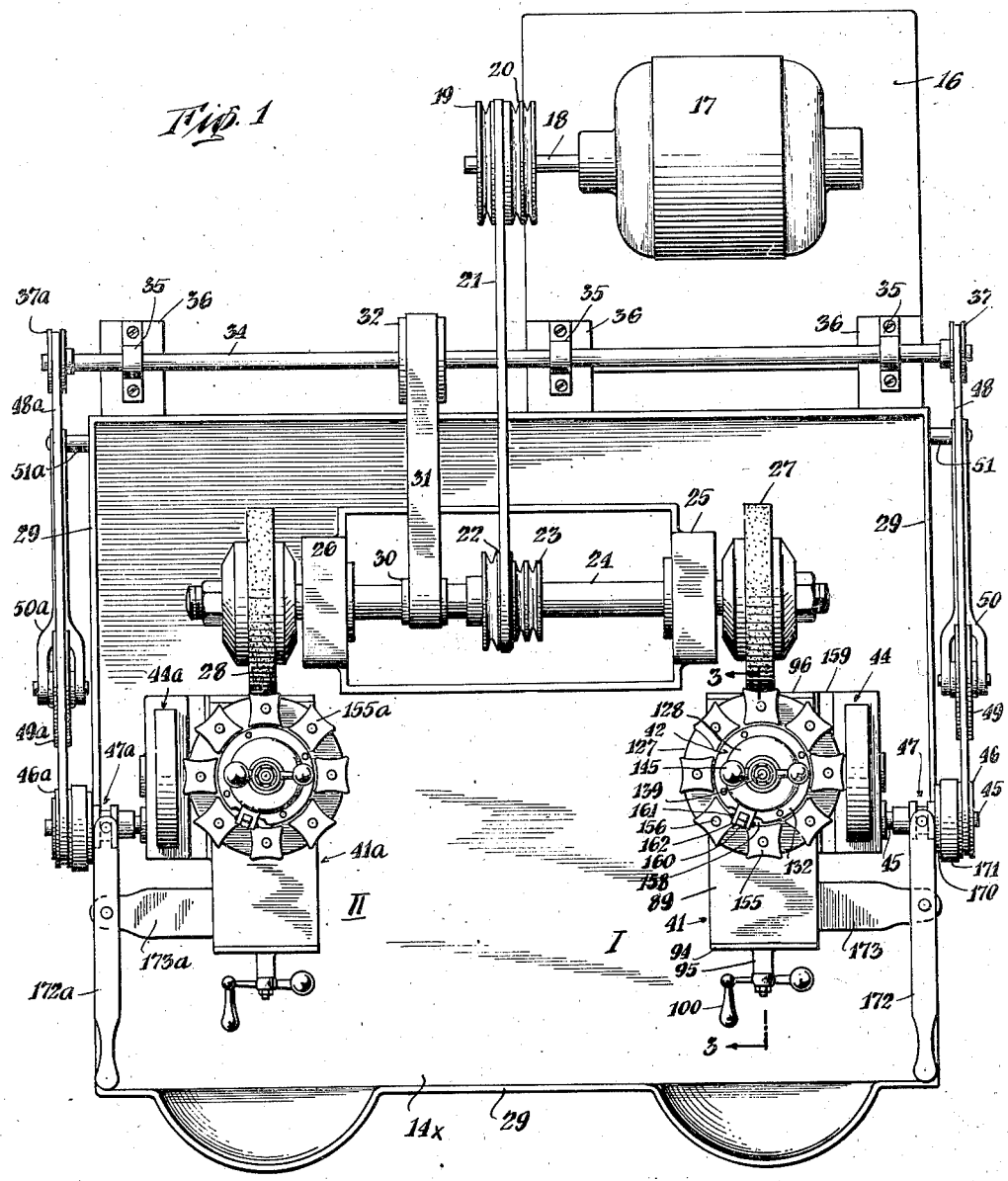

In the following description and in the claims, various details are identified by specific names for convenience, but they are intended to be as generic in their application as the art will permit.

Like reference characters denote like parts in the several figures of the drawings.

Figure 2:
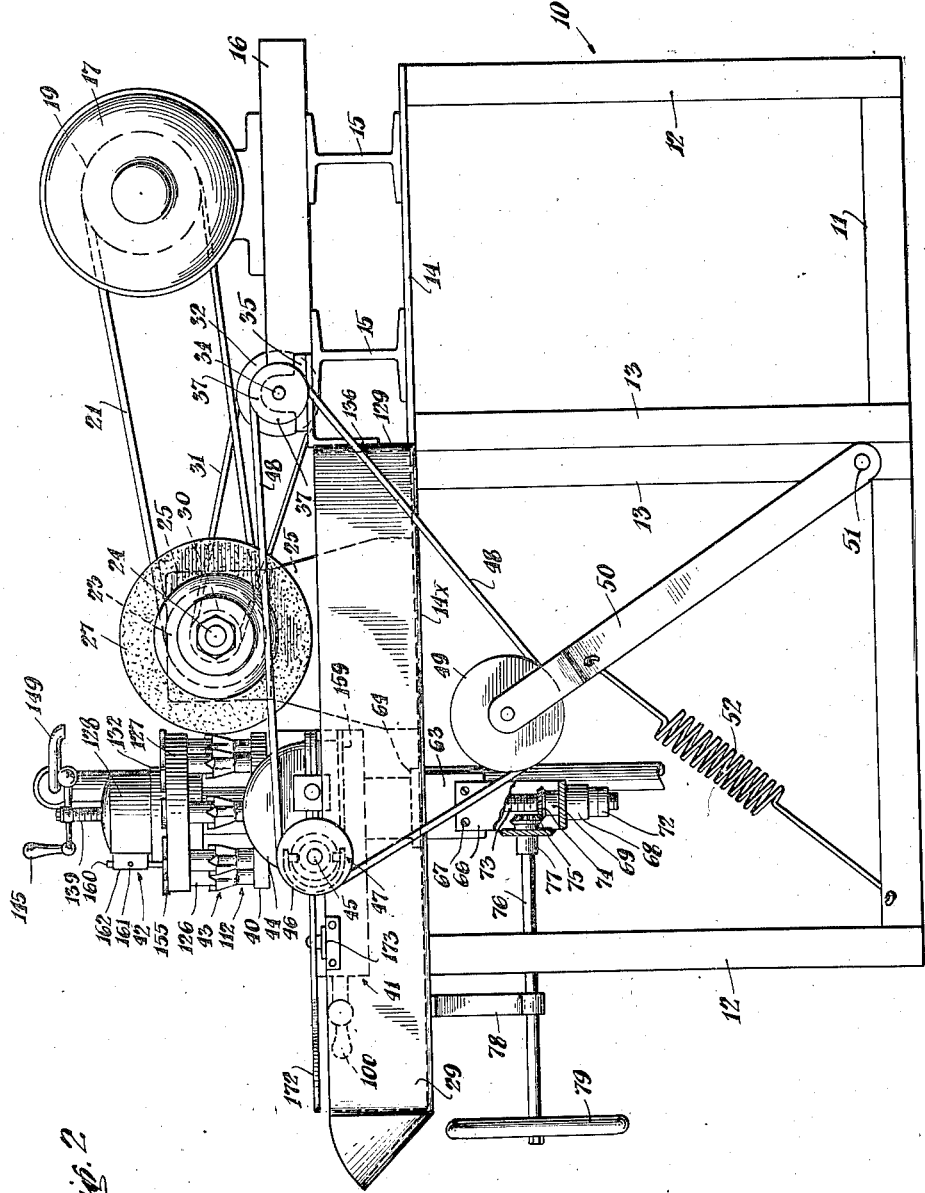
Fig. 2 is an end view in elevation, and partly in section, of the same machine.

Referring now to the drawings, the illustrated embodiment comprises a dual unit machine, that is to say, there are two turntable units I and II (see Figs. 1 and 2) mounted on a single frame, the frame being designated generally by reference character 10. The frame comprises suitable base members 11, vertical structural members 12 and 13 and horizontal structural members 14 forming a support or bench for mounting the various working parts. I-beams 15 support a base plate 16 upon which is secured a motor 17. The motor shaft 18 is provided with driving pulleys 19 and 20. A driving belt 21 is trained over one of pulleys 22 and 23 which are fixedly mounted on a shaft 24.

The shaft 24 is journalled for rotation in suitable bearings mounted in the vertical supports 25 and 26 which are in turn fixedly mounted on the bench 14x. The bench 14x is provided with an upstanding side wall 29. There is removably but securely mounted on each end of shaft 24 a suitable grinding wheel or disc 27 and 28, each of which rotates with shaft 24. Also fixedly mounted on shaft 24 is a pulley 30 over which is trained a driving belt 31 serving to rotate pulley 32 which is fixedly mounted on a shaft 34. This shaft 34 is mounted for rotation in suitable bearings mounted in supports 35 in turn fixed to brackets 36 on the side wall 29. Shaft 34 has fixedly mounted thereon at each end a pulley 37 and 37a.

Inasmuch as each unit (I and II) comprises like parts and mechanisms it will suffice to describe only one in detail. It will be observed that the parts of unit I are designated by reference numerals without sub-designations; whereas corresponding parts of unit II are designated by the same reference numeral with a sub-designation "a."

Referring more particularly to unit I (see Figs. 1 and 2), a rotatable turntable 40 is mounted on a carriage 41, which carriage is mounted for horizontal movement toward and away from the abrasive grinding wheel 28 and also for vertical movement. The turntable unit is also provided with a head 42 for holding the bits 43. Also mounted on the carriage 41 is a speed reducer 44. The shaft 45 mounts a pulley 46. A clutch arrangement 47 is provided whereby rotation of pulley 46 may be transmitted to shaft 45 to drive the speed reducer gears which in turn drive a shaft to rotate the turntable as described more in detail hereinafter.

A belt 48 is trained over pulleys 37 and 46 to transmit rotation of shaft 34 to shaft 45. Inasmuch as pulley 46 is movable with carriage 41 a long belt 48 is provided which is also trained over a belt tension pulley 49. Tension pulley 49 is mounted for rotation on a shaft mounted in a bifurcated end of a lever 50 pivoted at one end 51 to the frame, a tension spring 52 having one end hooked to the lever 50 and the other to the frame maintains belt 48 under desired tension regardless of the adjusted position of the carriage 41.

The construction of the turntable unit itself is shown in more detail and to larger scale in Figs. 3 to 7. Suitably mounted on the bench member 14x of the frame 10 is a depending housing 63 provided with a horizontally extending flange 64 which is secured to the frame in any suitable manner as by bolts 65.

A jack screw housing 66 is suspended from housing 63 and removably secured thereto by means of cap screws 67. The lower end of the jack screw housing terminates in a hollow boss 68 which mounts a sleeve 69. This sleeve has an annular shoulder 70 which engages the inner surface of the bottom wall 71 of the housing 66. The outer end of the jack-screw sleeve 69 is externally threaded to accommodate lock nuts 72. Thus, the sleeve 69 is mounted for rotation in the hollow boss 68. The sleeve 69 is internally threaded to accommodate jack-screw 73.

The upper end of the jack-screw sleeve 69 terminates in a bevel gear 74 which meshes with a bevel pinion gear 75 which is fixed to a shaft 76 suitably journalled for rotation in a bearing mounted in a hollow boss 77 extending horizontally from the jack-screw housing 66. The shaft 76 is further supported by a bracket 78 mounted on the frame. Rotation of hand wheel 79, secured to the outer end of shaft 76 (shown in Fig. 1) serves to rotate pinion 75 which in turn rotates bevel gear 74 and hence internally threaded sleeve 69. This provides means for raising and lowering the jack-screw 73.

The upper end of jack-screws 73 terminates in an upwardly extending pintle 80 (see Figs. 3 and 5) which fits into a bore in the bottom of turntable carriage supporting column 81. The bottom of the column 81 engages the annular shoulder 82 of the jack-screw 73. It will be observed also that a key 83 mounted in a keyway in the housing 63 and a keyway 84 in the column 81 prevents rotation of the latter and permits of raising and lowering it. The upper end of the carriage supporting column 81 terminates in a carriage supporting table 85.

The turntable carriage 41 is mounted to be carried up and down by the column 81 and is movable horizontally toward and away from the grinding wheel 28. A carriage bed plate 86 having a dove tail guide member 87 is secured to the table 85 by means of cap screws 88. The carriage table 89 has depending dove tail flanges 90 and 91 to form a channel to accommodate the corresponding dove tail guide member 87. Set screws 92 are provided in depending flange 90 to prevent undue play of the carriage table 89.

Secured to the front end of carriage table 89 by means of cap screws 93 is a depending apron 94 which mounts a bearing 95. At the rear end of the table is a corresponding apron 96 secured thereto by cap screws 97 and which mounts a bearing 98. Journalled for rotation in bearings 95 and 98 is a turntable carriage feed screw 99. This screw 99 may be rotated on its longitudinal axis by means of a hand crank 100 secured to the outer end of the screw 99.

The feed screw 99 extends longitudinally through the dove tail guide 89 and is threaded into an internally threaded sleeve 101 which is securely held in place in the guide member by the externally threaded end 102 (see Fig. 3). It will be apparent from the foregoing that the arrangement provides for horizontal movement of the turntable carriage 41, together with the structure mounted thereon, toward and away from the grinding wheel 28.

To support the turntable 40 and the head 42 on the carriage 41 (see Fig. 3) there is provided a column 105 fixed to and movable bodily with the carriage. The lower end of this head supporting column 105 is externally threaded and is screwed into a threaded aperture 106 in the carriage table 89. Mounted on the column 105 is a bearing 103 of the type in which roller bearings are mounted in a frame constituting a frustrum of a cone. A sleeve 107 resting on cone 103 is concentrically mounted for rotation about the column 105.

Mounted concentrically on the sleeve 107 is a bevel gear 108, the lower hub of which rests in bearing engagement with the roller bearing 103. The upper hub 109 of the bevel gear 108 is keyed to the sleeve 107 and the depending hub 110 of the turntable 40 by means of a key 111 in suitable keyways. Hence, when bevel gear 108 is rotated about the axis of the fixedly secured head supporting column 105, sleeve 107 and turntable 40 are rotated about the same common axis. A gear housing 146 provides a grease receptacle for lubrication. Rotation is imparted to the bevel gear 108 through a pinion meshing therewith as described hereinafter.

Circumferentially mounted on the turntable 40 are a plurality of bit supporting pintle members or tool holders 112, each to support a bit 43 for rotation about its own axis. In the embodiment shown there are eight such bit holders 112 equiangular distances apart and at the same radial distance from the center of the turntable.

Each bit holding pintle member (see Fig. 4) comprises a cylindrical cup shaped member 113 forming a base fitted into a corresponding aperture in the turntable 40, and a cylindrical member 114 rotatably mounted thereon. An upstanding ring portion 115 fits into a corresponding circular channel 116 in pintle member 114. It will be noted that member 114 bears upon a ball bearing 117, in the socket 118. The rotatable member 114 has an upstanding hollow neck portion or pintle 119 and an annular shoulder 120. The hollow neck portion 119 accommodates a grease cup and injector 121 to provide for lubrication through the grease duct 122 to the bearing 117.

The upstanding hollow pintle 119 is of a size to accommodate the hollow shank portion 123 of the bit 43 to support the bit with its drilling or percussion faces 124 on top. The bits are held firmly in place by means of a rotatable chuck 126 described hereinafter. The bits shown have four wings each having drilling faces 124 and each wing its side face 125. It will be understood that bits having less than or more than four wing faces may be dressed on the machine as well as four wing bits by suitable modification which the disclosure will readily suggest to those skilled in the art.

A turntable head arrangement designated generally by reference character 42 is mounted on the head supporting column 105 for vertical adjustment. It comprises in general a rotating head member 127 and a normally non-rotatable cap member 128, means for raising and lowering the head, and mechanism operative automatically to rotate each bit in step by step fashion about its own axis as the bit revolves on the turntable in its orbit about the turntable axis.

The turntable head cap 128 comprises a hollow cylindrically shaped dome which fits over the upper end of the head supporting column 105 in vertically slidable engagement therewith. Rotation of the head cap 128 is prevented by key 129 fitted into a suitable keyway in the interior surface of the hollow cap and a keyway in the column 105. A headed set screw 130 is provided to maintain the head firmly in desired adjusted position.

The lower part of the cap 128 has a larger hollow portion which extends down over the upper hub portion 131 of the rotatable head 127. An annular flange 132 extends horizontally from the cylindrical wall of the cap. A threaded lifting ring 133 is secured to the externally threaded upper end of the upper hub of the turntable head. A flat bearing ring 134 is secured to the annular flange 132 by means of cap screws 135. This ring 134 is mounted concentrically over the upper hub of the turntable head and is normally non-rotating since it is secured to the cap 128.

As will be observed in Fig. 3, the hollow hub 136 of the turntable head 127 is mounted for vertical slidable movement over the sleeve 107 and is keyed thereto to rotate with this sleeve by means of a key 137 fitted into a suitable keyway in the sleeve and a corresponding keyway in the hub 136. Ball bearings 138 in a circular race in the turntable head provides for minimum friction between the rotating turntable head and the normally stationary ring 134 which is secured to the cap 128.

The turntable head cap 128 together with the turntable head may be raised or lowered on the column 105 by means of a lifting screw 139 which is threaded through a corresponding aperture 140 in the dome of the cap 128. The lower end of the screw 139 is provided with a capped pintle 141 extending through and rotatable in a bushing member 142 which in turn is externally threaded and screwed into a threaded bore 143 in the upper end of the column 105. A small set screw 144 holds the bushing member in place. The lifting screw 139 may be rotated by means of hand crank 145.

It will be apparent from the foregoing that a rotation of screw 139 in proper direction will cause the head cap 128 to rise on the fixed post or column 105. As it rises the inner peripheral upper surface of ring 134 will engage the lower peripheral surface of lifting ring 133 which is secured to the turntable head hub thus causing the turntable head with the chucks 126 mounted thereon to rise. A reverse operation will lower the turntable head and chucks whereby the chucks will engage the upper faces of the bits 43 to hold them firmly on the pintle members 114. It will be understood that there are the same number of chucks mounted on the turntable head 127 as there are pintles on the turntable 40 itself and they are mounted to register with bits 43 mounted on the pintles.

The chuck mechanism (shown more clearly in Fig. 4) comprises a chuck 126, the bottom face of which is grooved to correspond and register with the protruding percussion faces of the drill bits. The upper end of the chuck 126 has an annular shoulder 150 and an upwardly extending boss or shank 147 of square cross section which fits into a square hole 151 in a cylindrical sleeve 152 which is rotatable in a suitable bearing 153 mounted in a corresponding aperture in the rotatable turntable head 127. The sleeve 152 has an annular flange 154 which engages the bottom surface of the turntable head 127. A star wheel disc 155 having a downwardly extending plug or boss of square cross section fits into the square hole 151 in the sleeve or hub 152. A cap screw 156 passing through a bore in the star wheel disc and boss and threaded into boss 147 maintains the peripheral lower surface of the star disc 155 in engagement with the top surface of the turntable head 127. A compression spring 157 around the boss 147 and between the flanges 154 and 150 permits of yielding pressure on the drill bits 43 when the machine is in bit grinding adjustment and provides for yieldingly holding the star wheel 155 in proper operative position.

It will be observed, as shown in Fig. 7, that the vertical sides of the star wheels 155 are in the form of an arc which engages the vertical outer side wall of the normally stationary ring 134. It will be observed also that ring 134 and flange 132 has a cut-away portion 158 (see Fig. 7) to permit of rotation through a certain angle of the star wheels 155 when they reach a position opposite this cut away portion. In this instance the star wheels have four points and four curved sides inasmuch as the bits illustrated have four wings. It will be apparent that the star wheels will be selected to have as many sides and points as the bits to be dressed have wings.

The cut-away portion 158 is provided to cooperate with a trip mechanism mounted on the head cap 128 operative automatically to rotate the chucks 126 and hence each bit through an angle of 90° about its own axis as each bit passes the trip mechanism in its revolution in its orbit about the axis of the turntable as the latter rotates on its axis. The trip mechanism (see particularly Figs. 3, 5 and 7) comprises a lever 160 pivotally mounted at about mid-length on a pivot 161 which in turn is mounted in a bracket 162 secured to the vertical side wall of cap member 128. A yieldable spring 163 mounted in a socket in the bracket 162 maintains the lower end of the lever 160 normally outwardly from the cap and in a position in the orbital path of the revolving star wheels 155. The lower free end of lever 160 is provided with a roller 164 rotatable on the end of the lever to minimize friction during the trip action. It will be observed that as a star wheel 155 passes the cut-away portoin 158 in its revolution about the turntable axis (see Figs. 3 and 7), a curved side of the star wheel will strike the lower end of lever 160. This will result in a trip action to cause the star wheel to rotate about its axis. Rotation is permitted because the point of the wheel adjacent cut-out portion 158 will move into it and as the rotation proceeds the same curved side of the star wheel will press the roller inwardly toward the cap 128 into the cut-out and move the lever out of the way to permit the star wheel to proceed in its orbital path. And when it passes the cut-away portion 158 the next succeeding point of the star wheel engages the ring 134. The vertical sides of the star wheel are curved to register with the curve of the ring. Hence, the star wheel and consequently the bit which it registers with will continue in the same relative angular position in its revolution about the turntable axis. Accordingly, the corresponding wing side face of the bit will pass the grinding wheel and will remain in the same relative angular position with respect to its own axis until its star wheel again passes the trip mechanism, at which time the bit is given another quarter turn on its axis to present the next succeeding wing side face to the grinding wheel when it reaches it in its travel in the circular orbital path.

Rotation is imparted to the bevel gear 108 (and hence to the turntable 40 and turntable head 127) through a pinion 166 (see Figs. 5 and 6) mounted on a pinion shaft which in turn is rotated through the speed reducer gears 167 and 168. As stated hereinbefore, the speed reducer 44 is driven by shaft 45. The speed reducer is mounted on a bracket 159 secured to the turntable carriage 41.

The clutch mechanism to throw the turntable mechanism into and out of operation comprises a flanged hollow shaft 169 keyed to shaft 45 and slidable longitudinally on the latter. A friction drum 170 secured to the hollow shaft 169 is thus movable into and out of engagement with the interior of the ring band 171 secured to the pulley 46 which is mounted to rotate freely on the shaft 45 when the clutch drum 170 is not in frictional engagement with the ring band 171. When the drum 174 and band 171 are frictionally engaged, hollow sleeve 169 will rotate shaft 45 inasmuch as they are keyed together. A conventional bifurcated clutch lever 172 pivotally moutned in an arm 173 secured to the turntable carriage 41 is provided to operate the clutch mechanism (see Fig. 1).

In describing the operation of the machine it will be assumed motor 17 is in operation. Belt 21 causes rotation of shaft 24 which in turn rotates the abrasive grinding wheels 27 and 28. A speed of about 1370 R. P. M. when using a conventional abrasive grinding wheel has proved satisfactory, although a peripheral speed of the grinding face will be selected best suited to the particular job at hand. Belt 31 will rotate shaft 34 and hence pulleys 37 and 37a. Since the two units are for all practical purposes the same, it will suffice to describe the operation of only one of the turntable units.

Belt 48 will rotate pulley 46 which will rotate freely upon shaft 45, it being assumed at the moment the clutch mechanism 47 is not in operating engagement.

By turning lifting screw 139, cap 128 and turntable head 127 are raised together with chucks 126. A drill bit 43 is placed in position on each of rotatable pintle members 114 by placing the hollow shank of the bit over a pintle 119. In the embodiment shown eight four-winged bits may be accommodated on the turntable. Lifting screw 139 is then rotated to lower the cap 128 and turntable head 127 until the lower faces of each of the chucks engage its corresponding and registered bit. The turntable head is lowered sufficiently to place the springs 157 under considerable compression to hold the bits firmly yet permitting of some vertical yieldability.

The turntable carriage is then adjusted vertically by means of the rotatable hand wheel 79 which rotates jackscrew 73. That is, the turntable is brought to a level which will present the drill bit wing side faces in proper grinding relation with the grinding face of the abrasive wheel 27. Then by means of hand crank 100, the carriage feed screw 99 is rotated to move the turntable to adjusted position, that is, so that the side faces of the bit wings will be brought into proper grinding and dressing engagement with the grinding face of the rotating abrasive wheel as the bits pass by it.

Having thus adjusted the turntable carriage horizontally and vertically, clutch mechanism is thrown into operative engagement with rotating pulley 46 by means of clutch lever 172 to cause the turntable 40 to be rotatively driven through speed reducer 44. With the usual drill bits and with a conventional abrasive wheel rotating at about 1370 R. P. M. it has been found that a rotational speed of about 30 R. P. M. is quite satisfactory for the turntable. If desired, a coolant such as water or other cooling liquid may be supplied to the grinding face through an adjustable nozzle 149 (see Fig. 2).

As the turntable rotates on its axis, the bit wing faces adjacent the periphery of the turntable are successively brought into grinding contact with the abrasive wheel. After that wing side face of each bit has been ground, each bit as it travels in its orbital path is given a quarter turn or an angular rotation of 90° on its own axis as it passes the trip mechanism mounted on the normally stationary cap 128. Hence, each bit is brought successively into grinding contact with the abrasive wheel as it passes the wheel in its circular orbital path of travel and each wing side face is brought successively into grinding contact by the step by step rotation of the bit on its own axis.

After all of the bits mounted on the turntable have been sufficiently dressed to proper gauge, the turntable rotation is stopped by throwing the clutch into inoperative position. The turntable head is raised to unclamp the chucks 126, the dressed bits removed, and the cycle repeated with additional bits to be ground.

It is significant to note that the bits gauged on a machine as illustrated do not have the conventional curved wing side faces wherein the radius of the curve is the radius of the bit but they are characterized by a nearly flat wing side face as shown more or less diagrammatically in Fig. 8—the full lines indicating the substantially flat side face; whereas the conventional curved side face is indicated in dotted lines, c.

It has been found that a bit dressed in accordance with the invention compared to the conventional bits with curved winged surfaces, is a freer cutting bit of increased reaming properties and in use under comparable conditions will have less gauge loss and hence a greater number of usages. Moreover, the use of the machine of the invention results in substantial increase in the number of bits which can be dressed with a given type of abrasive wheel when compared to known conventional methods of grinding.

While the machine has been described in connection with cold grinding by the use of an abrasive wheel, it will, from the disclosure, be apparent to those skilled in the art that the novel features of the machine as disclosed herein for illustrative purposes, may be used for hot milling. Consequently, the use of these novel features in connection with a hot milling and a hot milling tool in lieu of an abrasive grinding wheel is within the contemplation of the invention.

Accordingly, it will be understood that the invention is not limited to the specific arrangement illustrated as various substitutions and changes may be effected by those skilled in the art without departing from the spirit of the invention, the scope of which is intended to be commensurate with the appended claims.

What is claimed is:

1. A machine of the class described for dressing tools such as winged drill bits and the like which comprises a turntable rotatable about its axis, a plurality of bit holding members carried by said turntable and arranged circumferentially thereon whereby bits mounted on said holders travel in a circular orbital path on rotation of said turntable about its axis, said bit holding members being adapted to permit bits mounted thereon to be rotated about their own axes, a turntable head adjustable toward and away from said turntable and including a normally rotating head member and a normally non-rotating cap member, a plurality of chucks circumferentially arranged and carried on said turntable head to clamp bits mounted on said bit holding members to hold said bits firmly between said head and turntable, a tool dressing device operative to dress said bits, means to rotate said turntable about its axis, means for adjusting the turntable and tool dressing device relative to each other to bring said bits into tool dressing engagement with said tool dressing device, and mechanism mounted on said turntable head operative to rotate bits mounted on said bit holding members in step by step fashion to bring successive wings into tool dressing engagement with said tool dressing device as said bits travel in their orbital path.

2. A machine of the class described for grinding demountable winged drill bits which comprises a turntable rotatable about its axis, a plurality of rotatable bit holding members carried by said turntable and arranged circumferentially thereon whereby bits mounted on said holders travel in a circular orbital path on rotation of said turntable about its axis, said bit holding members being adapted to permit bits mounted thereon to be rotated about their own axes, a turntable head adjustably movable toward and away from said turntable and having a chuck mounting member rotatable with said turntable, a plurality of chuck mechanisms carried on said rotatable chuck mounting member of said turntable head to clamp bits mounted on said bit holding members to hold said bits firmly but rotatably between said head and turntable, a rotatable grinding wheel operative to grind the wing side faces of said bits, means to rotate said turntable about its axis, means for adjusting the turntable and grinding wheel relative to each other to bring the wing side faces of the bits into dressing engagement with said grinding wheel as they travel in said orbital path, and means on said head to cause said bits to be rotated on their own axes only when said bits are not in dressing engagement and to prevent said bits from rotating on their own axes when in engagement with said grinding wheel whereby the bit wing side faces may be successively dressed to substantially flat shape.

3. In a machine of the character described, a tool dressing device; a turntable; a plurality of tool holders arranged circumferentially thereon, a column to support said turntable for rotation; a turntable head mounted to rotate about said column; a feed screw to horizontally move said turntable toward and away from said tool dressing device; a screw to raise and lower said turntable, and column; tool clamping mechanisms, each including a rotatable chuck and a star wheel, mounted on said turntable head to clamp tools to be dressed on said tool holders; driving means to rotate said turntable to cause tools mounted on said holders to travel in a circular orbital path about the axis of said turntable and to successively pass said tool dressing device in tool dressing contact; and trip mechanism cooperating with said star wheels operative automatically to rotate tools mounted on said holders step by step as said tools travel in their orbital path about said turntable axis.

4. In a machine of the character described for dressing winged drill bits, a bit dressing tool, a rotatable turntable mounted for movement toward and away from said bit dressing tool, a head supporting column, means to support said turntable for rotation about said column, a turntable head mounted to rotate about said column with said turntable, a plurality of pintle members circumferentially mounted on said turntable, each adapted to support a winged bit for rotation about its own axis, a corresponding number of chuck mechanisms circumferentially mounted on said turntable head and arranged to register with bits mounted on said pintle members, each chuck mechanism comprising a chuck mechanism comprising a chuck to engage the percussion faces of bits mounted on the pintle members, a star wheel connected to said chuck, means for mounting each chuck for rotation about its axis, and trip mechanism mounted adjacent the orbital path of travel of said star wheels operative to rotate said star wheels step by step in their path of travel to cause each bit mounted on said turntable to present a successive wing face of each bit to the dressing tool as the bits revolve on the turntable about the turntable axis.

5. In a machine of the character described for grinding winged drill bits, a rotatable bit grinding wheel, a turntable, a carriage for mounting said turntable and arranged for movement toward and away from said bit dressing tool, a head supporting column mounted on said carriage, means to support said turntable for rotation about said column, a turntable head mounted to rotate about said column with said turntable, driving means to rotate said turntable, a plurality of pintle members circumferentially mounted on said turntable, each of said pintle members being adapted to support a winged bit for rotation about its own axis, a corresponding number of chuck mechanisms circumferentially mounted on said turntable head and arranged to register with bits mounted on said pintle members, each chuck mechanism including a chuck to engage the percussion faces of bits mounted on the pintle members and a star wheel connected to said chuck, means on said turntable head for mounting each chuck for rotation about its own axis, a normally stationary cap member mounted on said column and trip mechanism mounted on said cap member adjacent the orbital path of travel of said star wheels operative to rotate said star wheels on their own axes step by step in their path of travel to cause each bit mounted on said turntable to present a successive wing side face of each bit to the grinding wheel as the bits revolve on the turntable.

6. A machine for gauging demountable winged bits which comprises a frame, a grinding wheel mounted on said frame for rotation, a turntable, a carriage to support said turntable for rotation, means to move said carriage toward and away from said grinding wheel, a column to support said carriage for vertical movement, a rotatable jack-screw to support said carriage supporting column, means on said frame to support said jack-screw, means for rotating said jack-screw to raise and lower said carriage supporting column and carriage, a plurality of rotatable pintle members circumferentially mounted on said turntable each to support a winged bit for rotation on its own axis, a head supporting column mounted on said carriage and movable therewith, a normally non-rotating head cap supported by said head supporting column, a rotatable turntable head beneath said cap mounted for rotation about said head supporting column, a plurality of chucks circumferentially mounted on said turntable head for rotation and adapted to clamp winged bits on said pintle members, a rotatable star wheel connected to each of said chucks, and a lever pivotally mounted on said cap forming a trip to rotate each star wheel on its own axis on each revolution of the star wheels about the axis of the turntable to present a successive wing side face to the grinding wheel as the bits travel in their orbital path on the turntable.

7. A machine for gauging demountable bits having four wings which comprises a frame, a grinding wheel mounted on said frame for rotation, a turntable, a turntable carriage, a head supporting column on said carriage to support said turntable for rotation, a feed screw to move said carriage toward and away from said grinding wheel, a column to support said carriage for vertical movement, a rotatable jack-screw to support said carriage supporting column, means on said frame to support said jack-screw, means for rotating said jack-screw to raise and lower said carriage supporting column and carriage, a plurality of rotatable pintle members circumfertntially mounted on said turntable each to support a four winged bit for rotation on its own axis, a normally non-rotating head cap supported by said head supporting column, a rotatable turntable head beneath said cap mounted for rotation about said head supporting column, a plurality of chucks circumferentially mounted on said turntable head for rotation, the faces of said chucks being shaped to engage the percussion faces of said wing bits and to clamp said bits on said pintle members, a four pointed rotatable star wheel connected to each of said chucks, a lever pivotally mounted on said cap forming a trip to rotate each star wheel through an angle of 90° on its own axis on each revolution of each of said star wheels about the axis of the turntable to present a successive wing side face to the grinding wheel as each bit travels in its orbital path on the turntable.

8. In a machine of the character described, a tool dressing implement, a turntable, a plurality of tool holders arranged circumferentially on said turntable, means to rotate said turntable, a vertically adjustable turntable head having a rotatable head member and a non-rotatable cap member, a plurality of chuck mechanisms circumferentially mounted on said rotatable head member to clamp a plurality of tools to be dressed on said turntable arranged circumferentially to travel past said tool dressing implement in an orbital path about the axis of said turntable and mounted to rotate on their own axis, each of said chuck mechanisms comprising a chuck to engage a tool to be dressed, a shank extending from said chuck, a star wheel connected to said shank to rotate the chuck, and a trip device mounted on said cap member adjacent the orbital path of travel of said mechanisms to rotate said star wheels in step by step manner with corresponding rotation of tools clamped by said chuck mechanisms, said star wheels engaging said cap member to prevent rotation of tools clamped by said chuck mechanisms when said tools travel past said tool dressing implement.

9. In a machine of the character described, a tool dressing implement, a turntable, means to rotate said turntable, a plurality of tool holders on said turntable to mount a plurality of tools to be dressed by said implement, said tool holders being arranged circumferentially on said turntable to cause tools mounted thereon to travel past said tool dressing implement in an orbital path about the axis of said turntable and arranged to rotate tools mounted thereon on their own axes, each holder comprising a base portion, a pintle member mounted for rotation on said base portion, a bearing to minimize friction between said base portion and rotatable pintle member, and a duct to introduce lubricant to said bearing, a vertically adjustable turntable head including a rotatable chuck mounting member mounted to rotate with said turntable, a plurality of rotatable chuck members circumferentially mounted on said rotatable chuck mounting member to register with said tool holders and clamp tools thereon firmly in place, and means including a trip device on said turntable head to cause tools mounted on said holders to be rotated on their own axes during part of their travel in said orbital path and to hold said tools firmly without rotation on their own axes when said tools pass said dressing implement.

10. In a machine of the character described, a tool dressing implement, a turntable, a turntable head, means to rotate said turntable and turntable head in unison, a plurality of tool holders to mount a plurality of tools to be dressed by said implement, said tool holders being arranged circumferentially on said turntable to travel in an orbital path about the axis of said turntable and arranged for rotation of tools mounted thereon on their own axes, a plurality of chuck mechanisms mounted on said turntable head to clamp a plurality of tools on said holders, said chuck mechanisms being arranged circumferentially to register with said tool holders and mounted to rotate on their own axes, each chuck mechanism comprising a chuck to engage a tool to be dressed mounted on its corresponding holder, a shank extending from said chuck, a wheel connected to said shank to rotate the chuck, and a device operative automatically to rotate the wheel on its own axis in its orbital path of travel with a corresponding rotation of the tool clamped by the chuck.

ERNE ALOYSIUS WRIGHT.